March 10, 1964 H. RUDOLPH 3,124,647

SYNCHRONIZING TELEGRAPH TRANSMITTERS AND RECEIVERS

Filed Aug. 11, 1961

United States Patent Office 3,124,647

Patented Mar. 10, 1964

3,124,647

SYNCHRONIZING TELEGRAPH TRANSMITTERS AND RECEIVERS

Hans Rudolph, Munich-Solln, Germany, assignor to Siemens & Halske Aktiengesellschaft, Berlin and Munich, a corporation of Germany Filed Aug. 11, 1961, Ser. No. 130,969
Claims priority, application Germany Sept. 7, 1960
4 Claims. (Cl. 178—31)

This invention is concerned with a method of securing synchronous operation of transmitters and receivers in synchronously operating telegraph systems with parallel transmission.

Synchronously operating telegraph systems pose the problem of phasally synchronizing the receiver to the rhythm of the received telegraph symbols or telegraph elements, respectively. It is known to derive for this purpose impulses from the element polarity changes of the received telegraph symbols, and to compare these impulses with an alternating voltage with twice the element frequence of the received telegraph symbols, which is produced at the receiver side and rigidly in phase with the operation of the receiver distributor.

However, this method fails in the case of the socalled parallel transmission in which the individual elements of a telegraph symbol are simultaneously transmitted over a plurality of partial channels. This shall be explained with reference to an example in which the known 7-element code is utilized for the parallel transmission, such code providing, as is well known, three space current elements and four mark current elements for each symbol. Therefore, seven partial channels are required for the transmission according to the parallel transmission method. Upon using for the synchronization one of these channels, for example, the channel over which is always transmitted the first element of each symbol, no element polarity change can in given sequences of telegraph symbols occur in this channel over a prolonged interval, or individual element changes can occur only so rarely, that the synchronous polarity operation of the transmitter and receiver cannot be brought about or maintained with sufficient reliability. A particularly unfavorable telegraph symbol sequence is, for example, represented by the continuous transmission of the pause symbol $\beta$ during prolonged pauses in the message transmission. No element polarity change occurs in any of the partial channels during the entire pause and, accordingly, there is no element polarity in the partial channel which is being utilized for the synchroniaztion.

In order to overcome this drawback, it is known to cotransmit a synchronizing frequency over a further channel, but this expedient requires in addition to the expenditure for the further channel respectively a greater band width for the transmission path or reduction of the band width of all remaining channels, thus resulting in reduction of the transmission speed.

The object of the invention is to avoid these disadvantages, that is, to provide a method of securing the synchronous operation of transmitters and receivers in synchronously operating telegraph systems with parallel transmission and derivation of the synchronizing impulse from the element polarity changes, which permits reliable synchronization of the receiver, even in the presence of unfavorable sequences of telegraph symbols as they occur, for example, incident to the continuous or prolonged transmission of the identical symbol.

According to the invention, this object is realized by effecting, always after the transmission of one or several telegraph symbols, transmission of one or more complementary telegraph symbols and/or altering the element sequence of such symbols.

There are however even in the use of this method symbol sequences conceivable which do not produce, in one of the partial channels employed for the parallel transmission, sufficiently frequent element polarity changes and therewith synchronizing impulses or signals occurring sufficiently frequently for reliably securing synchronization.

The invention therefore proposes, in accordance with another feature thereof, to derive the synchronizing signals simultaneously from element polarity changes occurring in a plurality and preferably in all partial channels employed for the parallel transmission. These impulses can then be combined or collected, for example, in a known mixing gate, and utilized in common for the phase comparison with a square voltage which is rigidly locked to or in phase with the operation of the receiver distributor.

The invention will now be described with reference to the accompanying drawing showing in FIGS. 1 and 2 in diagrammatic manner embodiments thereof.

Figure 1:
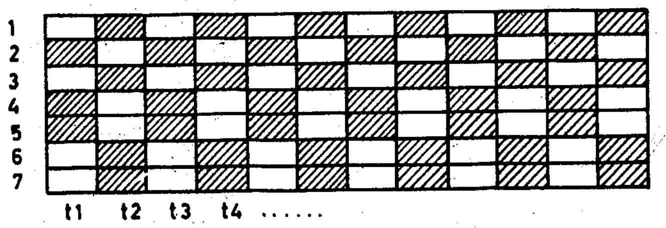
FIG. 1 shows the element sequence in seven channels 1 to 7 at the time intervals $t1$, $t2$, $t3$, $t4$ . . ., when the idling symbol $\beta$ is alternately normally and complementarily transmitted. There occurs in each channel, after an element polarity, an element polarity change, from which can be derived a synchronizing impulse.
Figure 2:
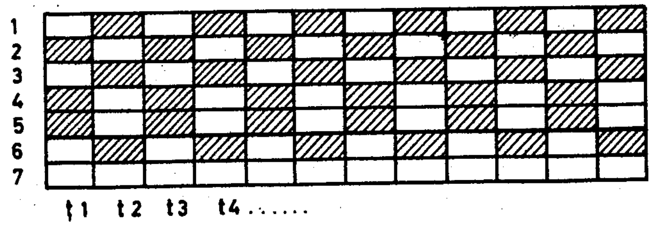
FIG. 2 shows the element sequences in the channels 1 to 7 at the time intervals $t1$, $t2$, $t3$, $t4$ . . ., when the individual elements of the idling symbol $\beta$ are alternately transmitted in the normal sequence (1, 2, 3, 4, 5, 6, 7) and in a changed sequence (2, 1, 4, 3, 6, 5, 7). An element change again occurs in this example in the channels 1 to 6 after each element.

It is understood, of course, that the methods explained above with reference to FIGS. 1 and 2 can be combined, whereby one or more complementary repetitions can be effected after several symbols or whereby other conceivable element sequences can be utilized.

Changes may be made within the scope and spirit of the appended claims which define what is believed to be new and desired to have protected by Letters Patent.

I claim:

1. A method of securing synchronous operation of transmitters and receivers in a telegraph system operating synchronously and with parallel transmission over a plurality of partial channels, comprising the steps of transmitting at least one telegraph symbol, effecting different polarity to given symbol elements, transmitting the symbol elements so formed following transmission of said first-mentioned telegraph symbol, and following reception of the latter and said symbol elements, forming synchronizchronizing impulses therefrom.

2. A method according to claim 1, comprising effecting said element polarity changes in a plurality of the partial channels utilized for the parallel transmission, and deriving said synchronizing impulses therefrom.

3. A method according to claim 1, comprising effecting said element polarity changes in all partial channels utilized for the parallel transmission, and deriving said synchronizing impulss therefrom.

4. A method according to claim 1, comprising effecting said element polarity changes by complementary polarity changes of the transmitted telegraph symbols.

References Cited in the file of this patent

UNITED STATES PATENTS

| | | |
|---|---|---|
| 2,934,604 | Bizet | Apr. 26, 1960 |
| 2,997,540 | Ertman et al. | Aug. 22, 1961 |
| 3,001,176 | Ingham | Sept. 19, 1961 |